Feb. 12, 1924. Re. 15,766

R. W. HARDIE

AIR HUMIDIFIER

Original Filed Aug. 10, 1921

INVENTOR

Robert W. Hardie

Reissued Feb. 12, 1924. Re. 15,766

UNITED STATES PATENT OFFICE.

ROBERT W. HARDIE, OF FANWOOD, NEW JERSEY.

AIR HUMIDIFIER.

Original No. 1,404,700, dated January 24, 1922, Serial No. 491,088, filed August 10, 1921. Application for reissue filed November 20, 1923. Serial No. 675,962.

*To all whom it may concern:*

Be it known that I, ROBERT W. HARDIE, a citizen of the United States, and a resident of Fanwood, in the county of Union and State of New Jersey, have invented new and useful Improvements in Air Humidifiers, of which the following is a specification.

The invention relates to that class of air humidifiers whereby vapor is discharged into an indoor atmosphere to increase the relative humidity thereof, and is in part a division, and in part a continuation, of the invention contained in the application filed by me in the United States Patent Office on the 20th day of August, 1920, Serial Number 404,951.

The invention is designed primarily to provide means for discharging into an indoor atmosphere, vapor in such a condition that it may be readily taken up by said atmosphere and become diffused therein.

Efforts have heretofore been made to increase the relative humidity of an indoor atmosphere by projecting steam or vapor into such an atmosphere, through a head or casing provided with layers of absorbent material of various kinds.

These efforts have proved unsuccessful for the reason that such material has no well defined apertures or orifices for steam or vapor to pass through, and consequently the vapor is condensed on the absorbent material instead of passing therethrough and saturating said material with the water of condensation.

A secondary vaporization from the outer surface of the absorbent material takes place under such conditions, without any of the original vapor passing through said material, but the revaporization produces no practical humidifying effect whatever.

Such efforts moreover, have proved impractical for the further reason that absorbent material, saturated with water at a high temperature, and exposed to the atmosphere forms a positive incubating bed for injurious bacteria.

Other efforts have been made to provide devices of that character having their interior filled and packed with material more or less absorbent, such as sponge, cotton, gauze, hair and felt.

Such efforts have likewise proved unsuccessful for the reason that the vapor or steam condensed on the absorbent material instead of passing therethrough and for the further reason that the filling of the casing with such material leaves no room for the expansion of the steam or vapor within the casing or for the return of the water of condensation from the steam or vapor which is ordinarily produced in devices of that character.

The main object of this invention is to provide a device whereby steam or vapor under initial pressure or impulsive influence may be reduced as nearly as possible to atmospheric conditions without condensation, or revaporization, and discharged noiselessly into an indoor atmosphere in such condition as to be readily absorbed and diffused therein.

A further object or purpose of the invention is to provide means for controlling the quantity of vapor discharged into the atmosphere, so as to regulate within limits, the relative humidity of such an atmosphere.

The invention further contemplates the idea of providing a device, of the character disclosed, which may be constructed of a single unit or station, adapted to be placed in the basement or hall of a dwelling or other structure, to discharge sufficient vapor to condition the atmosphere of the entire house or structure, or which may be embodied in small units so as to be placed in separate rooms or subdivisions of a house, or other building.

It is of the greatest importance in some classes of buildings and especially in hospitals to be able to produce in some parts of the building, a different relatively humidity from that of other parts of the building, and one of the objects of the invention is to provide means for so doing.

With the foregoing, and other objects in view, hereinafter stated, the invention consists of the construction hereinafter described, and illustrated in the accompanying drawings which show the invention in its preferred forms; but it is to be understood that other modifications thereof may be employed without departing from the general construction and mode of operation herein illustrated and described.

In the drawings, in which similar reference numerals indicate similar parts throughout the several views, Figure 1 is in part a vertical central cross section and in part a side elevation of a device embodying the invention in one of its forms.

Figure 1:
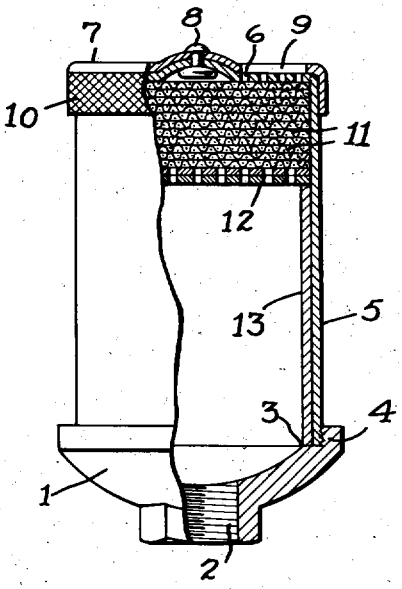

In carrying out the invention a body or casing of any suitable general construction may be used. In the instance shown, a base 1 is provided with an inlet aperture, 2, adapted to be connected with a source of steam or vapor supply, an annular shoulder, 3 and a flange, 4 having a threaded engagement with the lower end of a shell 5.

The top plate of the casing may be provided with any desired number of discharge apertures 6.

When used with means for controlling the outlet of vapor from said casing, the apertures are preferably arranged in a group at one or more portions of said top, leaving the remainder of said top imperforate.

When desired to regulate the discharge of vapor from the casing, a discharge control plate 7 is mounted upon the apertured top of the casing by means of a pivot pin—or stud 8, and thereby adapted to have a rotary movement on said pin or stud. The discharge control plate 7 is provided with an opening or cutaway portion 9 having an area equal to or greater than that occupied by a group of apertures of the top of the casing. The plate 7 is also preferably provided with a depending hand operated flange 10, loosely engaging the upper part of the body of the device, by means of which the plate 7 may be adjusted, so that the opening thereof may be arranged over an imperforate portion of the top of the casing, or expose any desired number of apertures, and thereby control the quantity of vapor passing out of the casing.

Within the casing or shell connected with the top thereof, there is contained a vapor conditioning member, designed to reduce the initial pressure, and retard the passage, of vapor therethrough, so that the vapor when discharged from the apertures of the top of the casing will be as near as possible of atmospheric condition, thereby enabling the vapor to pass out of the device noiselessly, and in a condition to be readily absorbed by the atmosphere without condensing on objects in the immediate vicinity of the device.

When the device is connected with a source of vapor supply, in which there is but little or no initial pressure, or positive impulsive effect or influence, the conditioning member may consist of a plurality of layers of woven wire mesh-material, 11, laid one upon another.

When so arranged parts of adjacent layers of wire mesh will be in contact with each other, and other parts in separated relation, thereby forming spaces between the respective layers communicating with the apertures or mesh of the layers themselves.

As the vapor passes through the body of layers, 11 it is combated by the strands of the material, and turned first in one direction, then in another, which, together with the friction produced by the wire strands of the member, reduce the initial pressure of the vapor, and permit the vapor to pass noiselessly out of the device, and to be readily taken up by, and diffused into the indoor atmosphere.

The layers of wire mesh-material are preferably supplemented, for ordinary purposes, with one or more perforated plates or disks 12, arranged within the casing, and spaced from the base 1 thereof.

Those plates or disks, by means of the apertures therein restrict the passage of vapor from the interior of the body of the casing into the layers of wire mesh and prevent the vapor within the casing from coming in contact, in the first instance, with the entire surface of the layers of wire mesh. The result is that when the vapor passes through the openings in the perforated plates, the vapor has room to expand and spread within the body made up of the layers of mesh material, thereby aiding in reducing the initial pressure of the vapor. The combined spaces and openings within the body of the member thereby in effect form a secondary vapor expansion member. By reducing the number and size of the apertures of the plate 12, the expansion area within the conditioning member is relatively increased.

Figure 4:
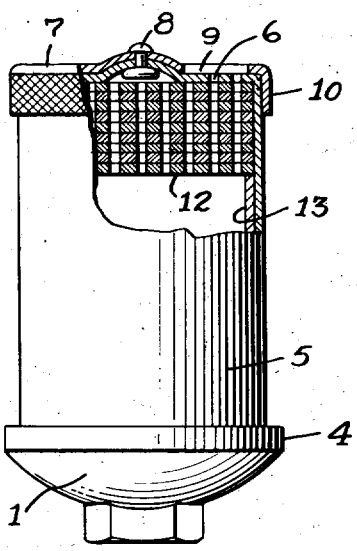
Figure 3 is a plan of one of the sections or layers of one of the vapor conditioning members and Figure 4 is a side elevation, partly broken away showing a vertical central section of the upper portion of a device having a body or casing substantially similar to that shown in Figure 1 with a conditioning member of modified construction.
Figure 2:
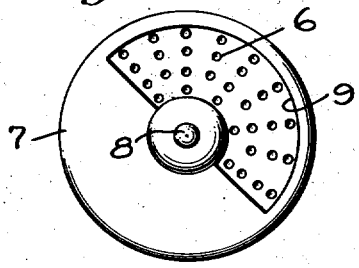
Figure 2 is a plan of the device shown in Figure 1.
Figure 3:
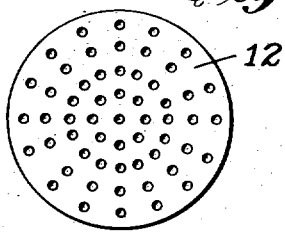

In cases where the device is connected with a source of vapor supply under positive pressure or impulsive effect or influence, the conditioning member may be constructed largely or entirely of the perforated plates 12, as is shown in Figure 4.

The conditioning member may be secured in place within the casing in any suitable manner, such as by means of a tubular shell 13, having its upper end bearing against the outer margin of the conditioning member and forming a supporting shoulder therefor, and its lower end bearing against the shoulder 3 on the base 1.

The tubular support is preferably extended slightly below the lower end of the casing wall, so that as the wall of the casing is screwed onto or into the base 1, the top of the casing will be pressed down onto the conditioning member, thereby compressing the layers of said member closely together to the desired extent, and hold the conditioning member securely in position on its tubular support. The supporting member also performs the function of closing the joint between the outer margin of the conditioning member, and the inner surface of the wall of the casing and prevents any vapor passing between said parts.

In cases where it is not desired to hold the layers of foraminous material pressed closely together, it is not essential that the shell of the casing be made adjustable relative to the shoulder or shell supporting the conditioning member, nor is it essential in any event that said shoulder or shell be made independently of the shell of the casing.

To obtain the best results from the use of this invention in cases where the conditioning member is comprised of layers of wire mesh fabric, it is desirable that the conditioning member be placed with its discharge apertures near to the interior surface of the apertured top of the casing; so that the vapor, as it leaves the conditioning member will pass quickly from the conditioning member into the atmosphere to become immediately diffused therein.

The apertures 6 of the top of the casing 5 enable the vapor discharged from the device to be controlled by means of the discharge control plate 7. In cases where it is not desired to control the discharge of vapor from the conditioning member, the control plate 7 is not essential, and where the conditioning member is comprised of apertured plate 12, as shown in Figure 4, the apertured top of the casing is not essential even when it is desired to control the amount of vapor passing out of the conditioning member.

In cases where the conditioning member is made of layers of wire mesh material, the capacity of the conditioning member for discharging vapor, and consequently the rate of discharge therefrom, may be adjusted and controlled, within limits, by slightly turning, on its bearing, the threaded member connected with the top plate. In such cases also the control plate is not essential.

By placing the conditioning member at the discharge end of the casing with portions of said member exposed to the atmosphere through the apertures of the top plate, vapor passes directly from the conditioning member into the atmosphere without restriction. In addition thereto an expansion chamber is provided between the inlet aperture and the conditioning member which permits vapor entering the casing to expand, and lose some of its initial pressure or impulsive effect, and also permits a free return to its source, of any water of condensation that may form within the expansion chamber; in consequence whereof only vapor in its most fitting condition passes into the conditioning member.

It is quite important, in some classes of buildings, that some means be provided for controlling the discharge of vapor into an indoor atmosphere. At certain times or seasons of the year, as in the spring or fall, it is necessary to have some heat, yet the outdoor atmosphere may be unusually moist and the air supplied with a high per cent of humidity.

At such times it is not necessary to supply an indoor atmosphere with the same amount of humidity in proportion to the quantity of heat supplied, as at other times, therefore means should be provided for limiting the quantity of vapor discharged into the atmosphere indoors.

On the other hand, there are times and seasons when the outside atmosphere is lacking in the average amount of humidity relative to its temperature, and in such case, the discharge of vapor indoors should be regulated or controlled so as to provide a greater discharge of vapor in proportion to the amount of heat supplied, than at other times.

Again in hospitals, and other places it is necessary to provide a percentage of relative humidity in one part of the building different from that in another part of the building.

The means herein disclosed are well adapted to control the indoor humidity as a whole, or by applying a plurality of units in different parts of a building the different parts may be provided with humidity of the relativity desired.

In the constructions shown and described the layers of material comprising the conditioning member are arranged in horizontal planes; that is not however an essential feature of the invention, nor is it essential that the discharge apertures be formed in the top of the casing. Such construction is preferred, however, for by such means the movable plate 7 may be brought directly and closely over any desired number of apertures, thereby positively closing said apertures against the escape of any vapor therefrom; and positively controlling the quantity of vapor passing out of the device, into the atmosphere.

It is preferable to make the layers of wire mesh material of a finer and closer mesh at the entering end of the member than at the discharge end, so as to restrict the passage of vapor at the entering portion more than at the discharge portion.

The particular size of the mesh, or of the apertures of the layers of material making the conditioning member and the number of layers used, is not of the essence of the invention.

For most purposes eighty mesh and eight or ten layers of material may be used.

When apertured plates are used the apertures of the plates may be of about one sixteenth of an inch or less in diameter, and layers enough may be used to make the conditioning member of one half an inch or more in thickness.

Instead of providing the inlet end of the device with an interiorly threaded stem, as shown in the drawing, that end may be provided with an exteriorly threaded stem extending laterally from the member as in the radiator air valves of ordinary construction, or vertically in line with the axis of the body of the device.

What I claim as new and desire to secure by Letters Patent is:

1. An air humidifying device comprising a casing having an inlet aperture and a plurality of discharge apertures, a vapor conditioning member having a plurality of superimposed layers of foraminous, non-absorbent material within said casing, with its discharge face adjacent to the interior surface of the apertured part of the discharge end of said casing, with apertures of said member communicating directly with the discharge apertures of said casing, and a discharge control plate mounted upon said casing and adapted to expose or cover said discharge apertures.

2. An air humidifying device comprising a casing having an inlet aperture at its lower end, a vapor conditioning member within the casing having a plurality of superimposed layers of non-absorbent material provided with apertures extending from the interior of the casing and exposed at their outer terminals to the atmosphere, and a discharge control plate mounted upon the discharge end of said casing and adapted to expose or cover the apertures of said conditioning member.

3. An air humidifier having an outer casing provided with a base having an inlet aperture, a plate within the casing spaced from said base and having apertures adapted to permit the restricted passage of vapor from the interior of said casing through said plate, a vapor discharge plate having apertures exposed to the atmosphere, wire mesh between said plates, and means for pressing said plates and wire mesh together.

4. An air humidifier having an outer casing provided with a base having an inlet aperture, a plate within the casing spaced from said base and having apertures adapted to permit the restricted passage of vapor from the interior of said casing through said plate, a vapor discharge plate having apertures exposed to the atmosphere, foraminous non-absorbent material between said plates, and means for pressing said plates and material together.

5. An air humidifier having an outer casing provided with a base having an inlet aperture, a plate within the casing spaced from the base thereof, and having apertures adapted to permit the restricted passage of vapor from the interior of said casing through said plate, a vapor discharge plate having apertures exposed to the atmosphere, and wire mesh material between said plates.

6. An air humidifier having an outer shell, a base having a threaded connection with said shell and provided with an inlet aperture, a plate within the casing spaced from the base thereof and having apertures adapted to permit the restricted passage of vapor from the interior of the casing through said plate, a vapor discharge plate connected with said shell and having apertures exposed to the atmosphere, foraminous, non-absorbent material between said plates, said plates and material being adapted to be pressed together by a rotary movement of said shell relative to said base.

ROBERT W. HARDIE.